United States Patent [19]

Blaschke et al.

[11] 4,388,577

[45] Jun. 14, 1983

[54] ROTATING FIELD MACHINE DRIVE

[75] Inventors: Felix Blaschke; Theodor Salzmann, both of Erlangen, Fed. Rep. of Germany

[73] Assignee: Siemens Aktiengesellschaft, Berlin & Munich, Fed. Rep. of Germany

[21] Appl. No.: 279,352

[22] Filed: Jul. 1, 1981

[30] Foreign Application Priority Data

Jul. 10, 1980 [DE] Fed. Rep. of Germany ....... 3026202

[51] Int. Cl.³ .............................................. H02P 5/40
[52] U.S. Cl. .................................... 318/717; 318/803; 318/808
[58] Field of Search ........ 318/798, 802, 803, 807–811, 318/712–715, 716–719

[56] References Cited

U.S. PATENT DOCUMENTS

| | | | |
|---|---|---|---|
| 3,824,437 | 7/1974 | Blaschke | 318/803 |
| 4,119,893 | 10/1978 | Bayer et al. | 318/798 |
| 4,276,505 | 6/1981 | Bose | 318/802 |

Primary Examiner—David Smith, Jr.
Attorney, Agent, or Firm—Kenyon & Kenyon

[57] ABSTRACT

In a rotating machine converter controlled drive, the EMF vector components formed from the stator current and stator voltage are integrated by means of a-c voltage integrators, the output quantities of which establish the components of the machine flux vector. In the converter control the parallel and normal components of the stator current relative to this flux vector are introduced. The a-c voltage integrators include zero controllers in a feedback circuit, into which the difference between the machine flux components and corresponding model flux components are introduced. The model flux components are calculated in a computing model circuit from the stator current, magnetization current and rotor position.

9 Claims, 9 Drawing Figures

ROTATING FIELD MACHINE DRIVE

BACKGROUND OF THE INVENTION

This invention relates to rotating field machines in general and more particularly to a rotating field machine fed by a frequency converter.

A rotating field machine drive with a frequency converter, a rotating field machine fed by the converter, two a-c voltage integrators, and a converter control connected to the outputs of the a-c voltage integrators is known in the art. Each a-c voltage integrator comprises an integrator having a component of the EMF vector of the machine, made up of the stator currents and stator voltages of the machine, fed to its input and has, as an output, a corresponding component of the magnetic flux vector of the machine. It further includes a feedback line connecting the integrator output with the integrator input, as well as a zero controller in the feedback line. Nominal values for the independent control of the stator current component parallel to the flux vector and the component normal thereto are introduced in the converter control.

In an asynchronous machine, the component of the stator current vector, which is formed by vectorial addition from the currents flowing in the stator windings in consideration of the winding axes, parallel to the axis of the magnetic flux (magnetization current) determines the magnetic flux of the machine, while the component normal thereto (active current) influences the torque of the machine. Now if it is possible to control the converter feeding the stator windings in such a way that the component parallel to the field and hence the intensity of the magnetic field induced in the machine remains constant, the torque of the machine can be controlled through the component of the stator current normal to the field. Such a field oriented regulation excels by its great accuracy and clear lay-out combined with optimum utilization of the converter and of the machine. Since the nominal value of the stator current is set with respect to the two field oriented coordinates or at least by the magnitude and angular position of the stator current vector with respect to the flux vector, the position of the flux vector with respect to the stator current windings, i.e., in a reference system fixed in space relative to the stator, must be known for the control of the converter.

The situation is similar in a synchronous machine, although here, in addition to the field parallel component of the stator current, the field parallel component of the exciter current which also contributes to the formation of the magnetic flux must be taken into consideration. Hereinafter the magnetizing current $i_{\phi 1}$ in a sychronous machine, therefore, is always understood to be the field parallel component of the vector sum of a stator current and exciter current.

The position of the magnetic flux vector can be determined by Hall probes, although such is generally avoided, in particular because of the space requirement and greater trouble proneness of the Hall probes under the prevailing conditions. In the above described arrangement, which is disclosed in German Pat. No. 28 33 542, therefore, the position of the magnetic flux vector and its magnitude is formed by calculating two components of the magnetic flux vector in a stator related coordinate system from input quantities of the rotating field machine using a computing model.

The computing model used may be termed a voltage model, since the Y-voltage at a machine lead is, after subtraction of the ohmic voltage drop, the EMF occurring at this lead, from which the contribution to the flux of the machine supplied by the respective stator winding can be formed by integration. By addition of a signal proportional to the respective machine current, the leakage inductance of the machine can then also be taken into account. Thus the two a-c voltage integrators of the known circuit, which are assigned to the voltages and currents in two different machine leads, have, as output quantities, two components which determine the flux vector in a coordinate system established by the winding axes of the stator windings. Instead of the direct input of the Y-voltage and of the current of a machine lead, analogously to the stator current vector, by corresponding vectorial addition of the stator voltages, a voltage vector in a stator-related coordinate system, for example a Cartesian one, the components of which together with the corresponding components of the current vector are used as input quantities for the a-c voltage integrators may be formed. The flux vector is then also calculated in the components of this coordinate system.

Circuit arrangements as described in German Pat. No. 28 33 593 and as provided in the method according to the above-mentioned German Pat. No. 28 33 542 are especially suitable as a-c integrators for such a field oriented control using a voltage model.

To avoid drifting of the integrators, however, the integrator zero must be maintained constant by a zero control. To this end according to German Pat. No. 28 33 593 a zero controller consisting of a P-controller and an I-controller is used in the integrator feedback line, the intervention of which is weighted as a function of the frequency. Together with the zero drift of the integrator, however, slow changes of the flux which are to be obtained at the integrator output and which correspond to low operating frequencies are also suppressed. Under stationary operation, moreover, the arrangement produces an angle error which, especially at low frequencies, also leads to a disturbing misorientation if, in the operation of the rotating field machine, the nominal values of the current vectors to be fed are oriented to the flux vector which is determined. The good dynamics of the current model is offset, therefore, by a misorientation in stationary operation which may lead to disturbances especially at low frequencies. To this must be added that, even at higher operating frequencies, there occur, for harmonics and subharmonics caused by the static converter, values for the damping and for the angle error which differ from the value tuned to the operating frequency and which may lead to the result that these oscillations are no longer sufficiently damped.

A model value for the flux actually occurring in the rotating field machine can, however, also be determined by another computing model circuit ("current model"), to the inputs of which only input voltages which correspond to the stator current, the magnetization current, and the rotor position are supplied. This computing model circuit simulates the processes which occur in the rotating field machine, and which lead to the development of the flux using corresponding electronic computing units; it is laid out differently depending on the type of rotating field machines used (synchronous or asynchronous machine). The paper "Control methods for rotating field machines" read at the Bildungswerk (Educational Institution) of the "Verein deutscher Ingenieure" (Association of German Engineers), the manuscript of which is sold by the VDI-Bildungswerk, Dusseldorf, under Order No. BW 3232, analyzes the structure of asynchronous and of synchronous machines, respectively. For all further discussions the nomenclature introduced therein is used, in which the indices $\phi 1$ and $\phi 2$ indicate the field parallel and field normal components of a vector; the indices $\alpha$ and $\beta$, the vector components in a Cartesian reference system fixed in space; and the index s, a quantity occurring in the stator.

In FIG. 5 on page 16 a frequency converter U for an asynchronous machine is shown, to the control of which there are supplied, on the left side, the nominal values for the stator current component parallel to the flux (magnetization current $i^{*s}{}_{\phi 1}$) and for the stator current component normal to the flux ($i^{*s}{}_{\phi 2}$). The converter feeds the asynchronous machine shown at the right in an equivalent structure with a stator current which, in a stator related coordinate system, has the magnitude $i^s$ and the angle $\epsilon^s{}_3$. For the control of an asynchronous machine there is indicated, at the left, a computing model circuit which determines, from the field-oriented nominal current values, the slip frequency, and therefrom, by means of the rotor position which is introduced as angle $\lambda_s$ of the rotor axis with respect to an axis of the stator-related coordinate system, the angle of the model flux vector in the stator related coordinate system. By a dynamics element (delay element) a model value for the actual value of the magnetization current and hence for the amount of the flux occurring is formed from the magnetization current component $i^{*s}{}_{\phi 1}$ of the stator current nominal value fed in. This model circuit, therefore, furnishes a model value, calculated only from the stator currents, for the magnitude and the angle of the flux in stator related polar coordinates, which, if necessary, can be converted to the components of the model flux with respect to Cartesian stator fixed axes.

Similarly, in FIG. 10 on page 19, an arrangement with a synchronous machine is indicated, where there is also supplied to the converter U at the left portion, next to the nominal values $i^{*s}{}_{\phi 1}$ and $i^{*s}{}_{\phi 2}$, the nominal value $i^{e*}{}_{100\ 1}$ for the exciter current component parallel to the flux. In the case of the synchronous machine there exists between $i^s{}_{\phi 1}$, $i^e{}_{\phi 1}$ and the magnetizing current $i_{\phi 1}$ the relationship $i^e{}_{\phi 1} = i_{\phi 1} - i^s{}_{\phi 1}$. The converter U, and its control, feed the exciter winding with an exciter current $i^e$.

In the current model it is a disadvantage that the model parameters must be adjusted very exactly to the machine parameters, and therefore a temperature related change of the rotor resistance, for example, will lead to errors in the determination of the model flux in stationary as well as in dynamic processes. Since, however, the flux determination at low frequencies is still more accurate, despite the sometimes unsatisfactory dynamics, than in the voltage model, the current model is preferred over the voltage model if the rotating field machine is to be operated in the low speed range.

It is the object of the present invention to provide a circuit arrangement which forms, both in the low and high speed ranges, a voltage signal which is proportional to a flux component of the flux occurring in a rotating field machine and which has a phase and amplitude error as small as possible independent of the machine frequency. At the same time the good properties of the device according to German Patent DE-PS No. 28 33 593 (voltage model) in the upper speed range are to be preserved or even improved.

SUMMARY OF THE INVENTION

According to the present invention, this problem is solved with a rotating field machine drive which includes a frequency converter; a rotating field machine fed by the converter; first and second a-c voltage integrators, each comprising an integrator having as an input a component of the EMF vector of the machine formed by the stator current and stator voltage and an output which is a corresponding component of the magnetic flux vector of the machine, a feedback line connecting the integrator output with the integrator input, with a zero controller in said feedback line; a converter control coupled to the outputs of the a-c voltage integrators having as inputs nominal values for control of the stator current component parallel to the flux vector and of the component normal thereto; a computing model circuit energized by a voltage corresponding to the stator current and to the rotor position, which computing model circuit simulates mathematically the processes that lead to the development of the machine flux and determines, by means of the rotor position, model quantities for the flux components; and means for adding the flux component model quantities onto the inputs of the zero controllers such that each zero controller eliminates an equal part in the difference between the flux component determined at the correlated a-c voltage integrator and the model quantity for this flux component.

The invention represents a combination of the voltage model with the current model. The zero controller is no longer used to eliminate long-term equal parts, i.e. quasi-stationary or dc-components, which are caused both by a zero drift of the integrator and by slow changes of the flux to be obtained at the integrator output occurring at low frequencies; instead only equal parts in the difference between the value calculated by the voltage model and the model value calculated by the current model are suppressed.

Hence the feedback branch of the voltage model integrator causes practically only the zero drift of the integrator to be controlled out. At the same time, as a result of the frequency responses upon addition of the two model circuits, the angle error of the output quantity becomes practically zero, regardless of how strongly the drift control intervenes. Rather, by varying the intensity of intervention it can be determined whether the output quantity is determined predominantly by the original voltage model or predominantly by the current model. The intensity of intervention, i.e., the weighting factor in the zero control of the voltage model according to DE-PS No. 28 33 593, now no longer needs be maintained proportional to the frequency, but may be selected in accordance with the respective needs.

In the low frequency range, the zero controller causes the voltage model value to follow the current model value. In the low frequency range (including 0 frequency), therefore, the output quantity is determined predominantly by the current model. Hence the properties of the current model which are particularly favorable in this frequency range are preserved. Moreover, the dynamics is even improved, since the voltage model acts by its good dynamics as a precontrol and intervenes correctively when rapid changes occur.

In the upper frequency range, the output quantity is determined predominantly by the voltage model, which is more favorable in this operating range, the angle error of the voltage model being largely compensated additionally by the current model without the errors of the current model being noticeable here to any great extent.

It is of further advantage that the amplification of the drift control, i.e., the factor $a<1$, can be selected much higher than in the original voltage model. Thereby a very good damping of harmonics and subharmonics is possible in every operating range without additional angle errors. Also, at variance with the teaching of DE-PS No. 28 33 593, the second weighting factor, which therein had to be chosen equal to the square of the first weighting factor, can now be optimized.

Possibilities for the circuitry implementing the computing model circuit for the current model have already been stated above. Preferably these model circuits comprise a dynamics element (first order delay element) energized by the magnetizing current (asynchronous machine) or respectively by the magnetizing current $i_{\phi 1}$ (synchronous machine), in particular by the nominal value thereof, and adapted to the time behavior of the rotating field machine, for the formation of a model value for the flux amount; a computing stage to which is also supplied, besides the input voltages for stator current and possibly magnetizing current, the model flux amount of the dynamics element, and which forms therefrom the model angle of the flux with respect to the rotor axis; a computing element which transforms the model flux now established by magnitude and angle into two vector components of a coordinate system which is given by two axes fixed with respect to the rotor of the rotating field machine; an a vector rotator to which the rotor position has been fed and which determines, from the rotor related coordinates, coordinates of the model flux vector which are now stator related.

In the case of an asynchronous machine, there remains, at a given magnetizing current (field parallel component of the stator current), only the component normal to the field vector (active current) for the description of the stator current. If the stator current is fed in through its field oriented coordinates, the latter can be determined from the stator related coordinates by means of an additional vector rotator in which the angle position of the flux vector is fed in. This angle position can be determined by means of a vector analyzer from the output quantities of the voltage model, but preferably the outputs of the current models are used. The components of the current vector may be the nominal values, but preferably the actual values are used.

A synchronous machine also contains, besides the field parallel and the field normal components of the stator current, the exciter current as a further degree of freedom. The magnetizing current is composed of the field parallel component of the stator current vector and the field parallel component of the exciter current, if a corresponding component of the damper current occurring in non-stationary states may be disregarded. In the case of synchronous machines, therefore, in addition to the field oriented coordinates of the stator current, a further input voltage for describing the magnetizing current, in particular for the nominal value of the magnetizing current is fed into the current model. From the rotor oriented angle position of the flux vector calculated in the current model itself, the current model for a synchronous machine can calculate, from the nominal value of the magnetizing current and from the field normal component of the stator current, the nominal value for the exciter current without additional expense, so that no additional inputs are necessary for the exciter current control. For simple controls, the exciter current may alternatively be fed in directly (e.g. constantly), so that then the actual value of the magnetizing current, i.e., the difference between the field normal component of the actual current of the exciter and the field normal stator current component, can also be fed into the computing model circuit. For the introduction of the stator current, stator related or field oriented actual or nominal value components may generally be used, the transformation from the stator reference system to the field-oriented reference system occurring by means of vector rotators and vector analyzers. For field oriented operation of a synchronous machine, the introduction of field oriented stator current components is simplest. Instead of the magnetizing current nominal value, a nominal value for the flux amount itself may be used.

DETAILED DESCRIPTION

Figure 1:
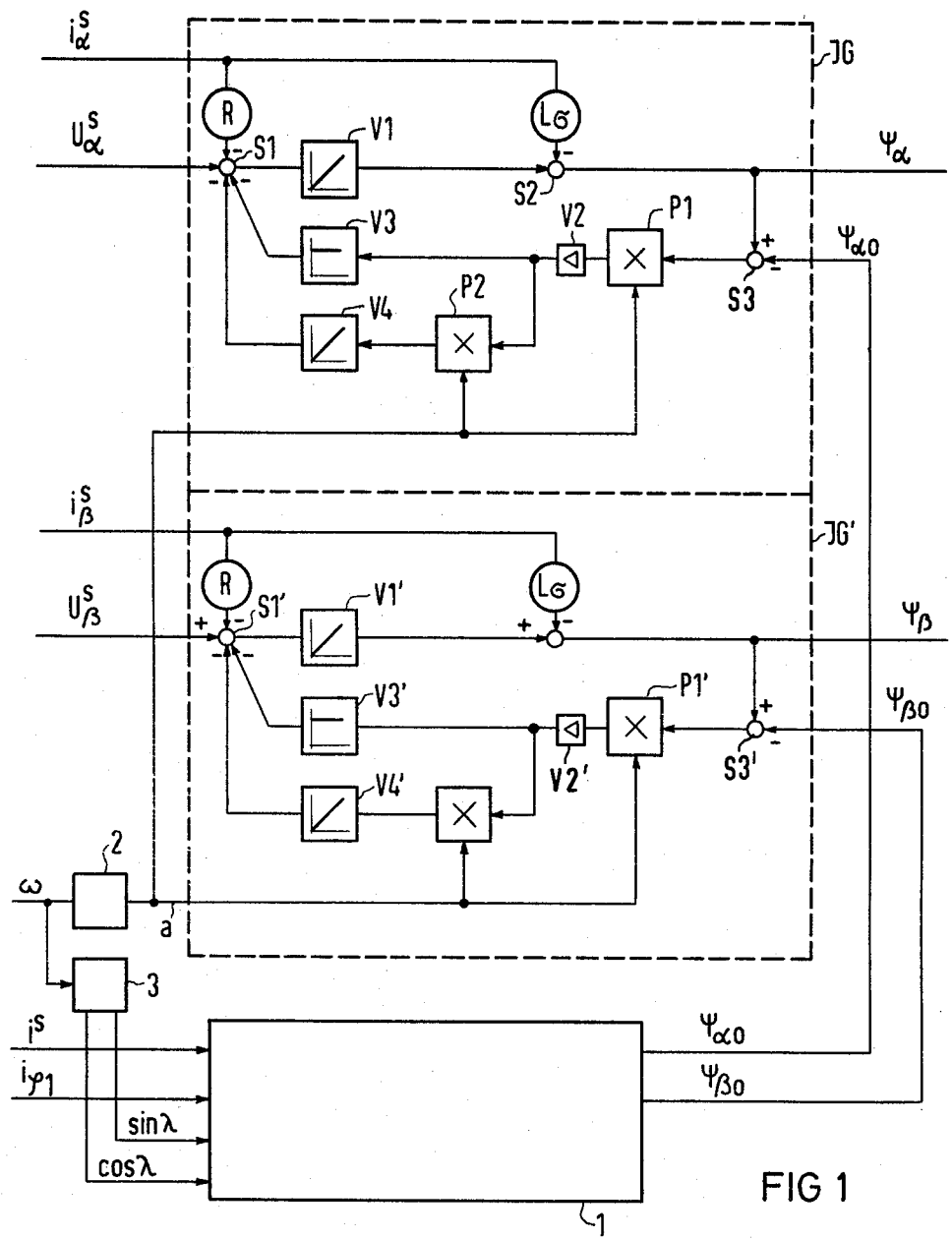
FIG. 1 illustrates two a-c voltage integrators to which are supplied, according to the present invention, the output signals of a computing model circuit.

According to FIG. 1, the inputs of the a-c integrators IG and IG' as described in German Pat. No. 28 33 593 have supplied to them the components of the stator current vector $i^s$ and of the voltage vector $U^s$, while at the output the corresponding components of the flux vector $\psi$ are provided. In the following, the indices $\alpha$ and $\beta$ will be used to designate the components of a vector in a stator related Cartesian coordinate system. The a-c voltage integrator IG thus processes the projections $i^s_\alpha$ and $U^s_\alpha$ of the stator current vector $i_s$ and of the voltage vector $U^s$ onto the $\alpha$ axis of the stator related coordinate system to the corresponding projection $\psi_\alpha$ of the flux vector $\psi$ onto the same axis, while the structurally identical second a-c voltage integrator IG' processes the corresponding projections $i^s_\beta$ and $U^s_\beta$ onto the β axis of the stator related coordinate system to the flux component $\psi_\beta$ in this coordinate system.

In the a-c voltage integrator IG the voltage component $U^s$ is supplied to a first summation point S1 at the input of an integrator V1. Simultaneously, for compensating the ohmic voltage drop in the machine, a voltage proportional to the stator current component $i^s{}_\alpha$, multiplied by the value of the ohmic stator resistance R, is also fed in a negative sense to the summing point S1. There is then present at the input of the integrator V1 a voltage proportional to the α component of the EMF vector. To compensate for the leakage inductance of the rotating field machine, a signal proportional to the current component $i^s{}_\alpha$, multiplied by the value of the leakage inductance $L_o$, may be added in a negative sense to the output signal of the integrator V1, preferably at a second summation point S2, so that thereby the corresponding component $\psi_\alpha$ of the magnetic main flux vector is formed.

To suppress the zero drift of the integrator, the output signal $\psi_\alpha$ is fed back via a proportional amplifier V3 and in parallel therewith via an integral amplifier V4 to the summation point S1, each time with sign reversal. The intensity of intervention for the zero drift control can advantageously be varied in that $\psi_\alpha$ is supplied to the proportional amplifier V3 proportionally to a weighting factor a and to the integral amplifier V4 proportionally to a weighting factor b. According to German Pat. No. 28 33 593, one selects $b=a^2$. To this end the multipliers P1 and P2 are used. Preferably the multiplication is done using the principle of pulse width multiplication, in that the multiplier input voltage is placed on the multiplier output via a switch whose open/closed ratio (duty cycle) is selected according to the multiplication factor a. The mean of the voltage present at the multiplier output then represents the product. While the integrator V4, because of its integration behavior, forms the mean itself, it is necessary, if the multiplier P1 is implemented using a correspondingly gated switch, to provide an amplifier V2 designed as smoothing element. The factor a can be formed from the rotor frequency ω by a function generator 2, the set function a (ω) of which will be explained in connection with FIG. 3. If pulse width multiplication is used, the function generator 2 further comprises a generator which furnishes a gated output voltage with a duty cycle corresponding to the factor a.

Now according to the present invention, a quantity $\psi_{\alpha o}$ is added to the output quantity $\psi_\alpha$ of the a-c voltage integrator at a summing function S3 at the input of the zero controller formed by the elements P1, P2, V2, V3, V4, in such a way that only equal parts in the difference $\psi_\alpha - \psi_{\alpha o}$ are controlled out by the zero controller. Analogously a quantity $\psi_{\beta o}$ is negatively added to the structurally identical a-c voltage integrator IG' at a summing point S3, preceding the multiplier P1', so that the zero controller of this second a-c voltage integrator also eliminates equal parts in the difference $\psi_\beta - \psi_{\beta o}$. The quantities $\psi_{\alpha o}$ and $\psi_{\beta o}$ represent the stator related components of a vector which is formed in the computing model circuit 1 used as a model for the flux vector of the machine. Using the currents supplied to the machine as inputs, this computing model circuit 1 simulates, in an electronic model, the processes which lead to the development of the flux (more exactly, the rotor flux) in the machine. As additional input information the current model needs information regarding the position (angle λ) of the rotor axis or respectively of the magnet wheel axis in the stator related system. This can be done, e.g., by a sine-cosine oscillator 3 fed by the rotor frequency ω which is set to the correct initial position at the start of operation and which feeds corresponding voltage signals cos λ and sin λ into the current model 1.

A plane vector is always determined by two reference quantities, e.g. magnitude and angular position or two components with respect to a given coordinate system. Therefore, two input quantities must be fed into the current model as information about the stator current vector. In the case of a corresponding design of the computing model circuit still to be explained, a stator oriented or a field oriented (i.e. revolving with the flux vector) Cartesian coordinate system or also a polar coordinate system may be used as the reference system, since, at a given flux angle, conversion is always possible by means of vector analyzers, vector rotators or polar/Cartesian coordinate transformers.

In a synchronous machine, the current model requires, in addition to the stator current vector, information about the magnetizing current $i_{\phi 1}$. Since the computing model circuit and the a-c voltage integrators determine the position of the flux vector itself and since the rotor position (and hence the direction of the exciter current) has been fed in, the magnetizing current is fixed, e.g., by the amount of the exciter current $i_e$ according to the equation $i_{\phi 1} = i^e{}_{\phi 1} + i^s{}_{\phi 1}$. In an asynchronous machine the exciter current is obviated, and the magnetizing current $i_{\phi 1}$ is identical to the field parallel component $i^s{}_{\phi 1}$ of the stator current vector. In the following, the indices $\phi 1$ and $\phi 2$ are used to designate, in a field oriented coordinate system, the component parallel to the flux vector ($\phi 1$) and the component normal thereto ($\phi 2$).

Figure 2A:
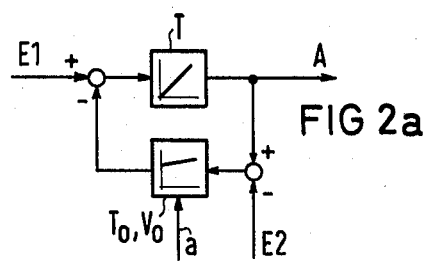
FIG. 2a shows the structure of an a-c voltage integrator.
Figure 2B:
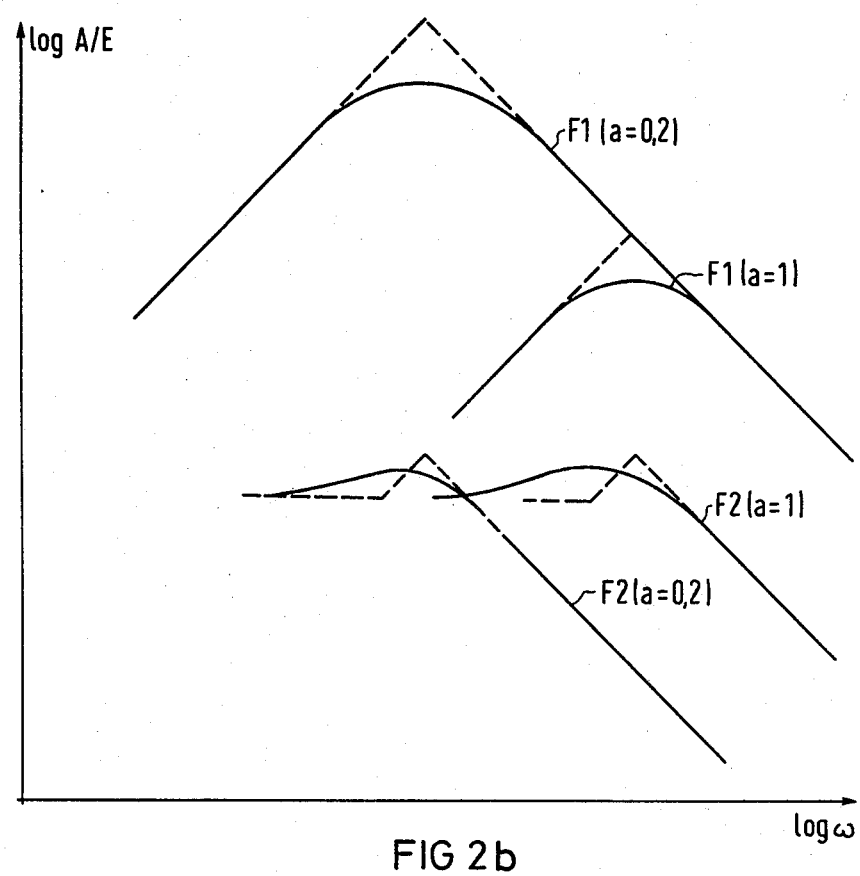
FIG. 2b shows the frequency responses F1 and F2 of the a-c voltage integrator output signal for the signals supplied at the integrator input and at the input of the zero controller.

In FIG. 2a, the structure of an a-c integrator is indicated, the integrator V1 being symbolized by an integrator of the time constant T, and the zero controller by a P-I (proportional-integral) controller of the time constant $T_o$ and gain $V_o$. The natural frequency can be adjusted by the weighting factor a. For the two inputs E1 and E2, the frequency responses which are shown in FIG. 2b for two different parameter values a=1 and a=0.2 result and for which the following applies:

$$F_1 = A/E_1 = pT_o/(1+pT_oV_o+p^2TT_o)$$

$$F_2 = A/E_2 = (1+pT_oV_o)/(1+pT_oV_o+p^2TT_o)$$

Figure 3:
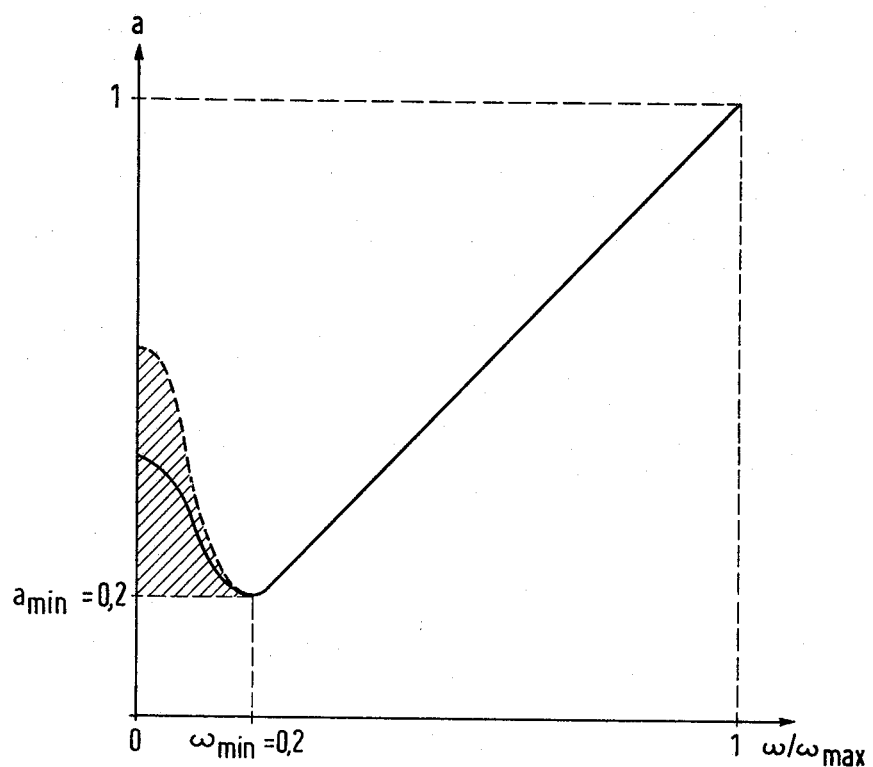
FIG. 3 illustrates the preferred frequency dependence of the intensity of intervention (weighting factor a) of the zero controller.

Now if the EMF of the machine is fed in at input E1 (EMF=p.T.$\psi$) and at input E2 the model flux $\psi_o$ calculated by the current model, there results for the signal at output A $$A = E_1F_1 + E_2F_2 = \psi,$$

if the current model is matched to the machine exactly ($\psi = \psi_o$). Hence it turns out, surprisingly, due to the use of the current model, that now, at least theoretically, the flux determined by the combination "voltage model/current model" no longer shows an angular error. In particular, the computed flux is independent of the damping which is variable by the factor a. Now, therefore (at variance with German Pat. Nos. 28 33 542 and 28 33 593), the weighting a need no longer be proportional to the frequency, but instead the weighting factor a and hence the intensity of intervention of the zero control can be optimally matched to the respective frequency. In FIG. 3 the function a (ω) which can advantageously be fed into the function generator 2 is shown. This function increases from a minimum $a_{min}$ lying in the lower speed range, proportionally to the frequency, to the value 1 at maximum frequency. In special cases, a different function curve lying in the hatched area may be advantageous for $\omega < \omega_{min}$. Nor is it necessary to feed the differences $\psi_\alpha - \psi_{\alpha o}$, $\psi_\beta - \psi_{\beta o}$ with the weighting factor $a^2$ into the integral controllers V4 and V4'. Instead another weighting factor may be used.

Figure 4:
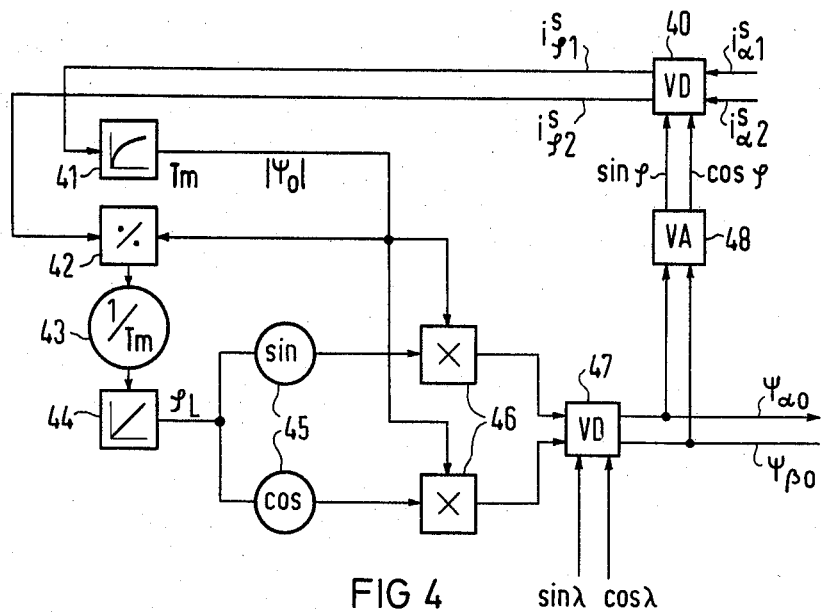
FIG. 4 is a circuit diagram of a computing model circuit (current model) for use in an asynchronous machine.

FIG. 4 gives an example for the construction of a computing model circuit for use in an asynchronous machine. In an asynchronous machine it is preferable to introduce the stator current by its actual values. The conversion from stator related stator current compounds $i^s{}_\alpha$, $i^s{}_\beta$ to field oriented components $i^s{}_{\phi 1}$ and $i^s{}_{\phi 2}$ is done by means of a vector rotator 40, into which the angle $\phi$ between flux vector and the $\alpha$ axis of the stator reference system is fed by corresponding voltages sin $\phi$, cos $\phi$. The field parallel component $i^s{}_{\phi 1}$ (magnetizing current) is fed into a dynamics element 41, e.g., a smoothing element with a time constant Tm matched to the behavior of the asynchronous machine, the output signal $\psi_o$ of which indicates the amount of the flux vector establishing itself in the machine at given magnetizing current (Tm is given as the quotient of the main inductance and rotor resistance of the machine). The structural elements 42, 43 and 44 are used to determine from the field normal component $i_{\phi 2}$ (active current), by division by the flux amount and time constants, the variation—occurring at a given active current $i_{\phi 1}$—of the angle between field axis and rotor axis (i.e. the slip frequency), whence the angle $\phi_L$ results by integration. By means of angle function generators 45 and multipliers 46, the rotor related components $\psi_o \sin \phi_L$ and $\psi_o \cos \phi_L$ of the model flux can now be converted therefrom in the vector rotator 47 in accordance with the previously mentioned rotor position input to the stator related components $\psi_{\alpha o}$ and $\psi_{\beta o}$ of the model flux. From this model flux vector the vector analyzer 48 forms the angle position (sin $\phi$, cos $\phi$) of the flux vector in the stator system, which is needed for input into the vector rotator 40.

In principle, instead of the actual stator current values $i^s{}_\alpha$, $i^s{}_\beta$ and $i^s{}_{\phi 1}$, $i^s{}_{\phi 2}$, respectively, the corresponding nominal values can be used, and the vector analyzer 48 can instead of the model flux components $\psi_{\alpha o}$, $\psi_{\beta o}$, use the output quantities $\psi_\alpha$, $\psi_\beta$, of the a-c voltage integrator itself. This option, however, has the disadvantage that in an asynchronous machine there is then a danger that, in the course of operation, the current model and voltage model will move apart.

Figure 5:
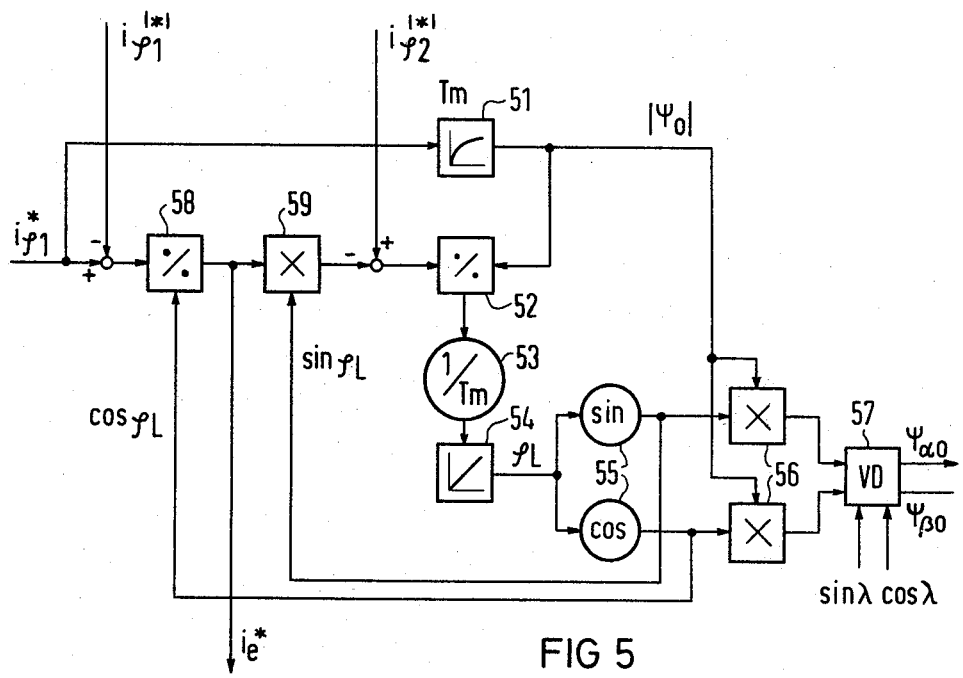
FIG. 5 is a circuit diagram of a computing model circuit (current model) for use in a synchronous machine.

In the circuit shown in FIG. 5 as an example for a current model of a synchronous machine, on the other hand, the nominal values $i^{*s}{}_\alpha$, $i^{*s}{}_\beta$, can be used instead of the actual values without any further disadvantages. If the stator current is set in the stator reference system, the respective inputs can be preceded by a vector rotator corresponding to the vector rotator 40 in FIG. 4. Here the model flux amount $\psi_o$ is formed analogously from the magnetizing current $i_{\phi 1}$, by means of a dynamics element 51, which is fed in preferably as nominal value. At variance with FIG. 4, it is not possible to apply the component of stator current normal to the field directly on the divider 52, corresponding to divider 42 for the formation of the angle variation $\phi'_L$ or respectively of the angle $\phi_L$ between the rotor axis and field axis. Instead, it is necessary to take the damper current into account. To this end the addition of $i_{\phi 1}$ and $i^s{}_{\phi 1}$, the divider 58, and the multiplier 59 are used, the nominal value $i^*{}_e$ of the exciter current being formed between the divider output and the multiplier input. This nominal value can be used directly for the control of the exciter current feed, without any further information being required. The formation of the model flux vector in a rotor related reference system by means of the elements 55 and 56 and in a stator related reference system by means of the vector rotator 57 is effected in a manner similar to FIG. 4.

The computing model circuit 1 just described, as well as the a-c voltage integrators IG and IG' explained in connection with FIG. 1, the function generator 2 and the oscillator circuit 3 are employed, according to FIG. 6, in a circuit arrangement for the operation of a synchronous machine 4. Supply of the exciter current is by means of a supply device 5. The stator windings of the synchronous machine are fed by a frequency converter with impressed intermediate loop current, consisting of the network controlled rectifier 6, the intermediate circuit 7, and the self-commutation inverter 8. The currents $i^s{}_R$ and $i^s{}_S$ flowing in the inverter outputs R and S, as well as the voltages $U^s{}_R$ and $U^s{}_S$ occurring in these lines, represent the components of the stator current vector $i^s$ and of the voltage vector $U^s$ in a stator related coordinate system set up by the respective winding axes of the synchronous machine which subtend an angle of 120°. From these, by means of coordinate converters 9, the corresponding components $i^s{}_\alpha$, $i^s{}_\beta$, $U^s{}_\alpha$, $U^s{}_\beta$, in a Cartesian stator reference system, which are supplied to the inputs of the a-c voltage integrators IG and RG' are formed. The internal circuit of the a-c voltage integrators in which, through intergration of the EMF, the corresponding stator related flux components $\psi_\alpha$, $\psi_\beta$ are formed, as well as the zero controllers which eliminate equal parts in the differences $\psi_\alpha - \psi_{\alpha o}$ and $\psi_\beta - \psi_{\beta o}$, are shown only schematically. From the a-c voltage integrator output quantities $\psi_\alpha$, and $\psi_\beta$, a vector analyzer 10 determines the angle position (sin $\phi_S$, cos $\phi_S$) of the magnetic flux vector in the Cartesian stator reference system, as the angle of rotation of a vector rotator 11, applying the corresponding signals to the latter.

For control of a synchronous machine, the amount $i^s$ of the actual stator current value together with a corresponding nominal value $i^{s*}$ is added at the input of a current regulator 12, which furnishes the control voltage for the drive unit 13 of rectifier 6. The synchronous machine is operated in a field oriented manner in that, for the determination of the nominal stator current value, the nominal angle between the stator current vector and flux vector or respectively the angle $\alpha$ (control angle) shifted thereto by 90° between the nominal stator current and the EMF vector, is also set.

To this end, the nominal value $i^{s*}{}_2$ of the field-normal stator current component, which is tapped, e.g., from a torque reqgulator, and the onmial value $i^{s*}{}_1$ of the field-parallel stator current component, which is supplied, e.g., by a reactive power regulator, are fed into an additional vector analyzer 18. The vector analyzer furnishes, in addition to the nominal value $i^{s*}$ of the stator current amount needed for the current regulator 12, the angle functions of the control angle in the field-oriented coordinate system, which is converted in the vector rotator 11 into the stator related Cartesian components of a control vector for the drive unit 16 of the inverter 8, there being executed further, by means of a coordinate transformer 17, the transistion from Cartesian coordinates to the three stator winding axes offset relative to each other by 120°.

The nominal value $i^{s*}_{\phi 1}$ of the magnetizing current as well as the nominal component values $i^{s*}_{\phi 1}$ and $i^{s*}_{\phi 2}$ are fed into the a-c computing model circuit. Alternatively the corresponding actual stator current values, may be introduced if, according to the lines shown in broken lines, the actual stator current values $i^s_\alpha$, $i^s_\beta$ are transformed into the corresponding field oriented components via a vector rotator 15, into which is fed the position of the flux vector determined in the vector analyzer 10.

Figure 6:
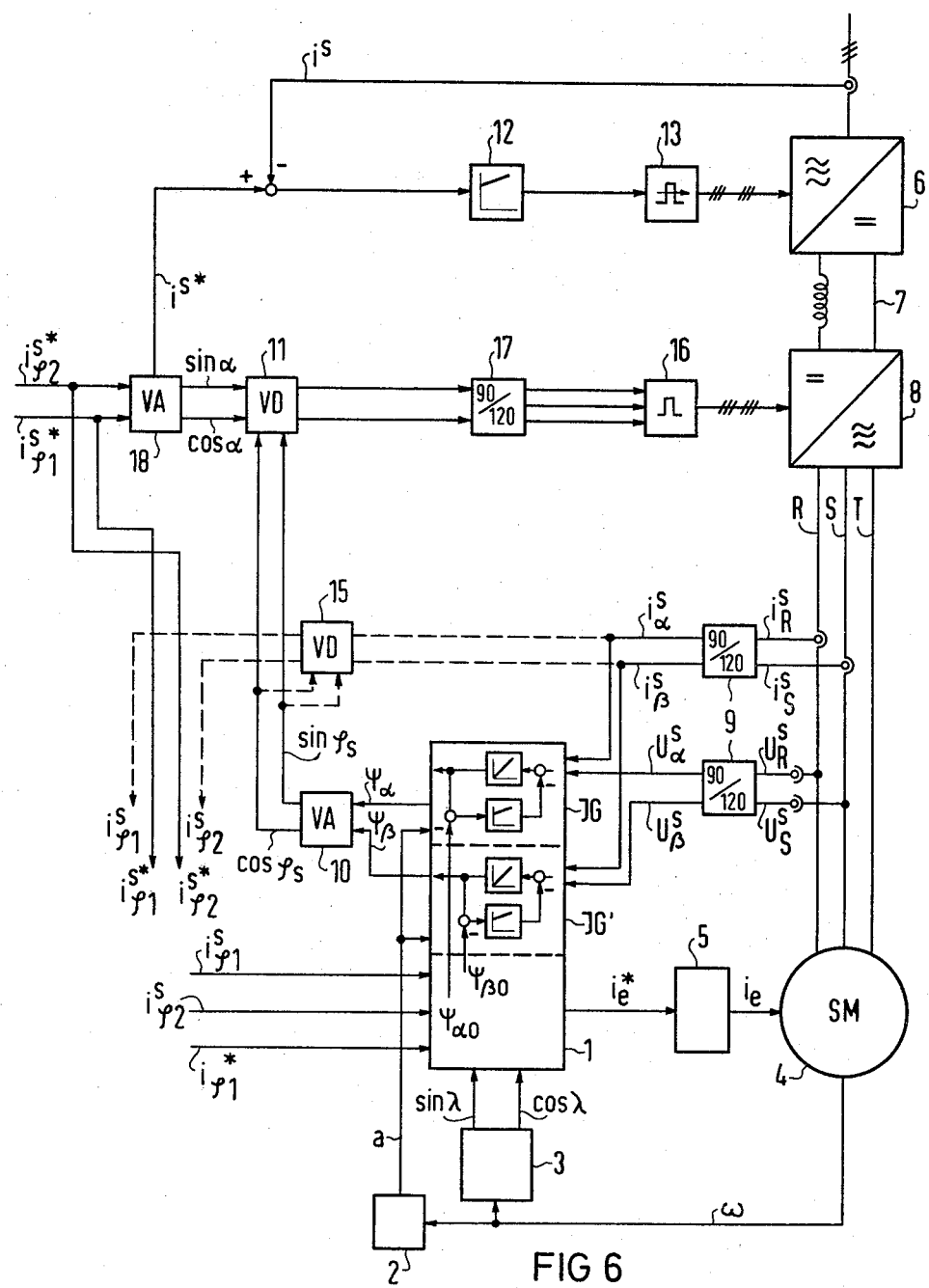
FIG. 6 illustrates a circuit arrangement for operating a synchronous machine fed by a frequency converter (static converter motor) with impressed intermediate loop current.

FIG. 6 corresponds essentially to FIG. 3 of German Pat. No. 28 33 542, with the exception of the computing model circuit 1. In that figure, however, the components $i^s_R$, $i^s_S$, $U^s_R$, $U^s_S$ are supplied to the a-c voltage integrators directly, so that the a-c voltage integrators also furnish the flux components in the 120° reference system set up by the stator axes and are converted by means of a subsequent coordinate transformer corresponding to the coordinate transformers 9. Such an arrangement is also possible according to FIG. 6, provided the flux components $\psi_{\alpha o}$, $\psi_{\beta o}$, furnished by the computing model circuit in the Cartesian system are converted by a 120°/90° coordinate transformer into this 120° reference system before being fed into the zero controller of the a-c voltage integrators.

Figure 7:
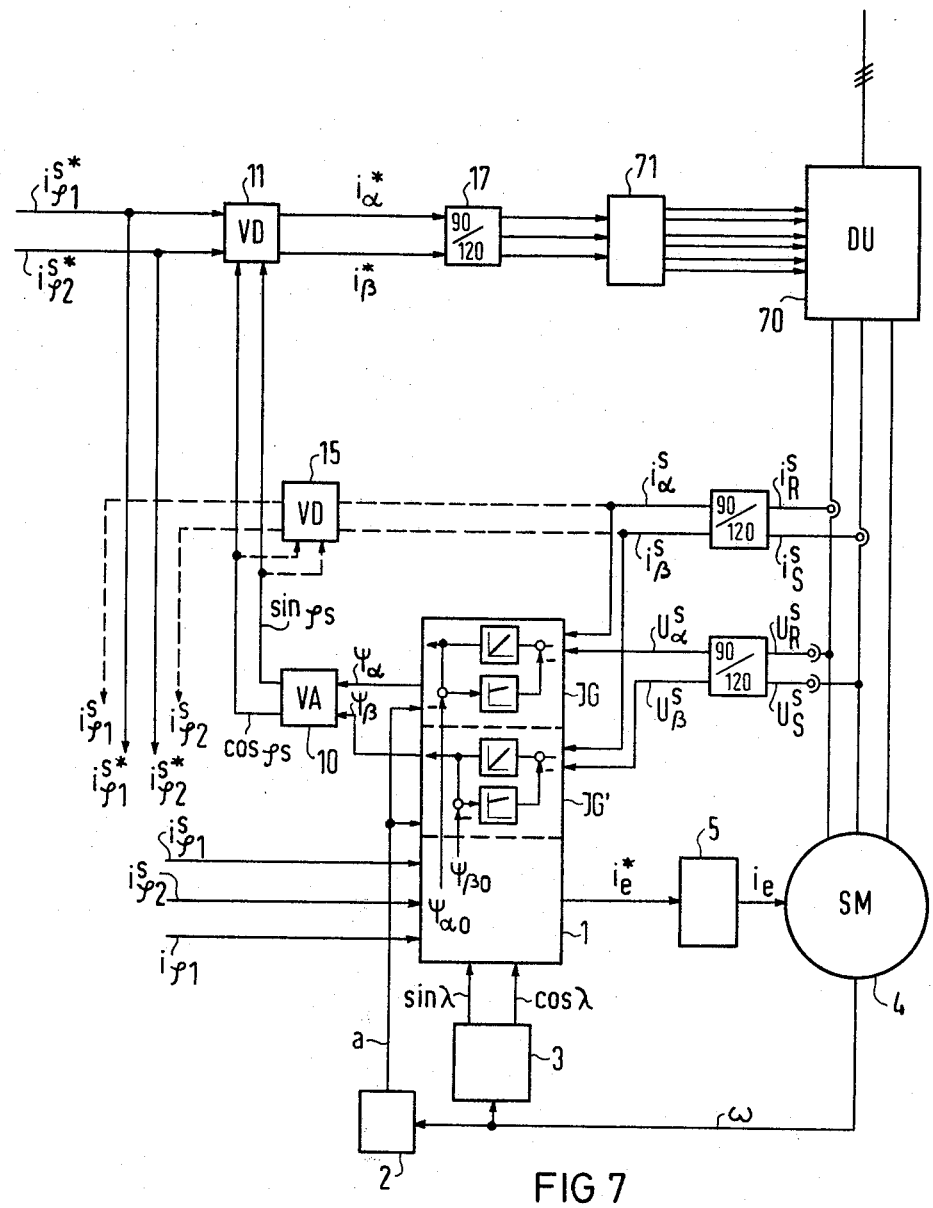
FIG. 7 illustrates a circuit for operating a synchronous machine fed by a direct converter.

FIG. 7 shows an arrangement for operating a synchronous machine which is fed by a direct frequency converter 70. At variance with FIG. 6, the nominal values for the field oriented stator current components are fed into the vector rotator 11 directly. At the output of this vector rotator nominal component values $i^{s*}_\alpha$, $i^{s*}_\beta$ in the Cartesian stator reference system are present. These values are transformed by the coordinate transformer 17 into the corresponding input for the direct converter drive 71.

Figure 8:
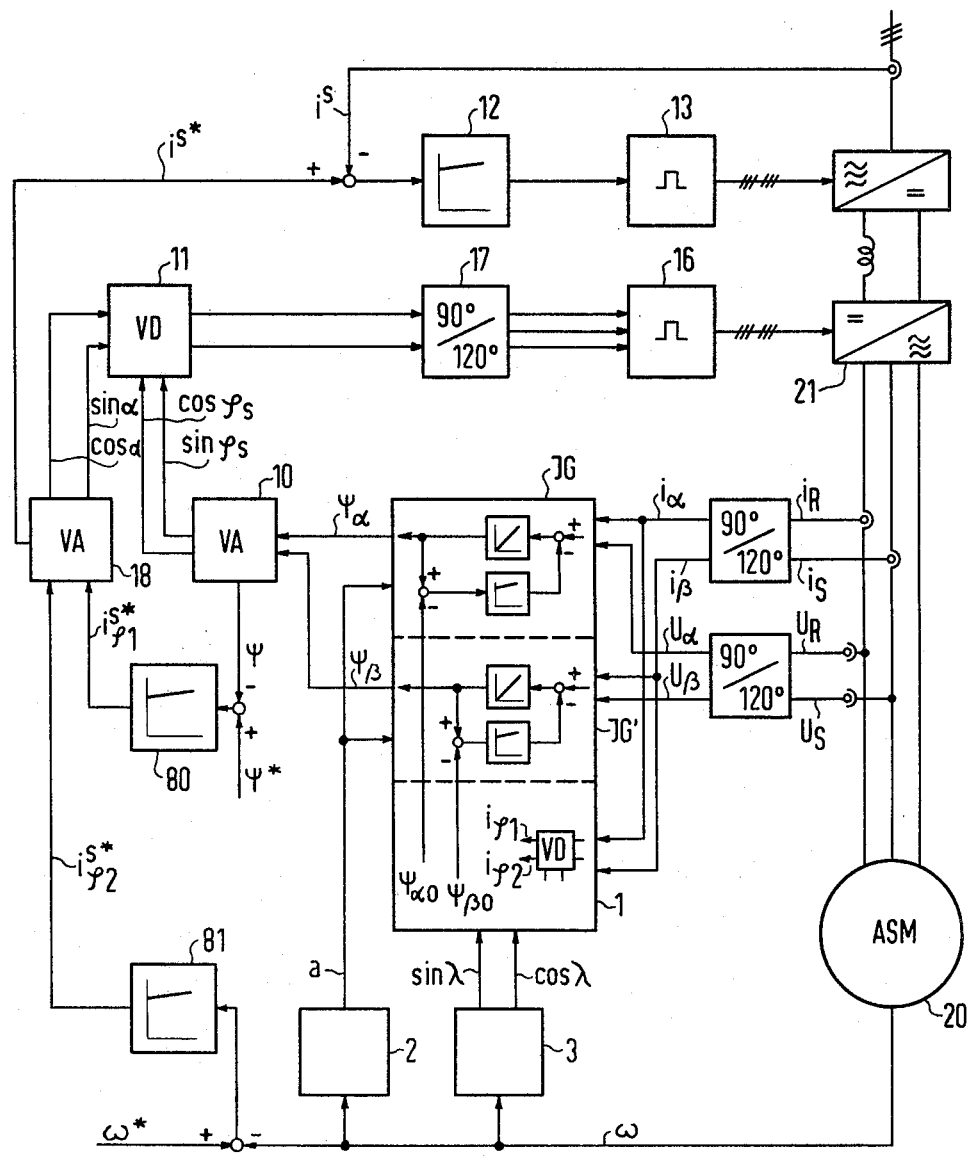
FIG. 8 shows a circuit arrangement for operating an asynchronous machine fed by a converter with impressed intermediate loop current.

As an example of a field oriented control of an asynchronous machine is shown in FIG. 8. An asynchronous machine 20 which is fed by a current converter with an intermediate circuit whose inverter 21 is preferably adapted for phase sequence cancellation is illustrated. Since essentially the same elements already described in FIG. 6 are used for this purpose one need only note that, in contrast to FIG. 6, the Cartesian stator related current components, are used as input quantities for the computing model circuit 1, whose internal structure corresponds to FIG. 4, in order to connect the current model more closely with the asynchronous machine. In general, the introduction of further information for the magnetizing current is obviated in as asynchronous machine. The control of the asynchronous machine is completed by a flux controller 90, which by comparison of the amount $\psi$ of the flux vector obtained from at the vector analyzer 10 with a nominal flux value $\psi^*$ furnishes the nominal value for the field-parallel component $i^{s*}_{\phi 1}$ of the stator current vector, and by a speed regulator which causes the nominal value $i^{s*}_{\phi 2}$ of the field normal stator current component to follow the difference between a nominal speed value $\omega^*$ and the measured actual speed $\omega$. Naturally a torque regulation for the formation of $i^{s*}_{\phi 2}$ is also possible.

The use of the vector rotators, vector analyzers and coordinate converters not explained in detail is described in detail in German Pat. No. 28 33 542.

What is claimed is:

1. A rotating field machine drive comprising:
   (a) a frequency converter;
   (b) a rotating field machine fed by the converter;
   (c) first and second a-c voltage integrators, each comprising an integrator having as an input a component of the EMF vector of the machine formed by the stator current and stator voltage and an output which is a corresponding component of the magnetic flux vector of the machine, a feedback line connecting the integrator output with the integrator input, with a zero controller in said feedback line;
   (d) a converter control coupled to the outputs of the a-c voltage integrators having as inputs nominal values for control of the stator current component parallel to the flux vector and of the component normal thereto;
   (e) a computing model circuit energized by a voltage corresponding to the stator current and to the rotor position, which computing model circuit simulates mathematically the processes that lead to the development of the machine flux and determines, by means of the rotor position, model quantities for the flux components; and
   (f) means for adding the flux component model quantities onto the inputs of the zero controllers such that each zero controller eliminates dc-component in the difference between the flux component determined at the correlated a-c voltage integrator and the model quantity for this flux component.

2. A rotating field machine drive according to claim 1, wherein, said machine is synchronous and said computing model circuit is further energized by a voltage corresponding to the magnetizing current.

3. A rotating field machine drive according to claim 1, wherein each zero controller comprises a proportional controller having as an input the difference between said flux components multiplied by a first weighting factor, an integral controller having as an input said difference multiplied by a second weighting factor and a summing junction at the integrator input for summing the controller outputs with the integrator input.

4. A rotating field machine drive according to claim 3, wherein said computing model circuit includes a dynamics element for simulating the flux from the field-parallel stator current component in an asynchronous machines, or respectively the magnetizing current in synchronous machines, in a rotor-related reference system, and a vector rotator energized by the rotor position input for the formation of the stator-related model flux component.

5. A rotating field machine drive according to claim 4, wherein said dynamics element is energized by the stator current component corresponding to the magnetizing current or respectively by the magnetizing current and determines a model flux amount, and further including a computing stage to which is supplied the model flux amount as well as at least the field-normal stator current component and which determines the model angle of the flux relative to the rotor axis, and a subsequent computing element which computes from the model angle and from the model flux amount the components of the model flux in a rotor related reference system.

6. A rotating field machine drive according to claim 5, wherein said computing stage forms the model angle by integration of the slip frequency determined from the field-normal stator current component and from the model flux amount.

7. A rotating field machine drive according to claim 3 wherein an asynchronous machine is used, and, for the description of the stator current and of the magnetization current, the field-oriented coordinates of the stator current are fed into the computing model circuit.

8. A rotating field machine drive according to claim 7, wherein the field oriented components of the stator current are formed from the actual value components of the stator current vector in a stator related coordinate system by means of an additional vector rotator, into which is fed, via a vector analyzer connected to the output of the computing model circuit, the angle position of the model flux vector in the stator related reference system.

9. A rotating field machine drive according to claim 3 wherein a synchronous machine is used and wherein the nominal value of the amount of the magnetizing current is fed into the computing model circuit as a voltage corresponding to the magnetizing current, and the field oriented components of the stator current as voltages corresponding to the stator current.

* * * * *